Oct. 19, 1926.
H. SCHNECKLOTH
CUTTING-OUT REAMER TOOL
Filed Sept. 30, 1921
1,603,359
2 Sheets-Sheet 1
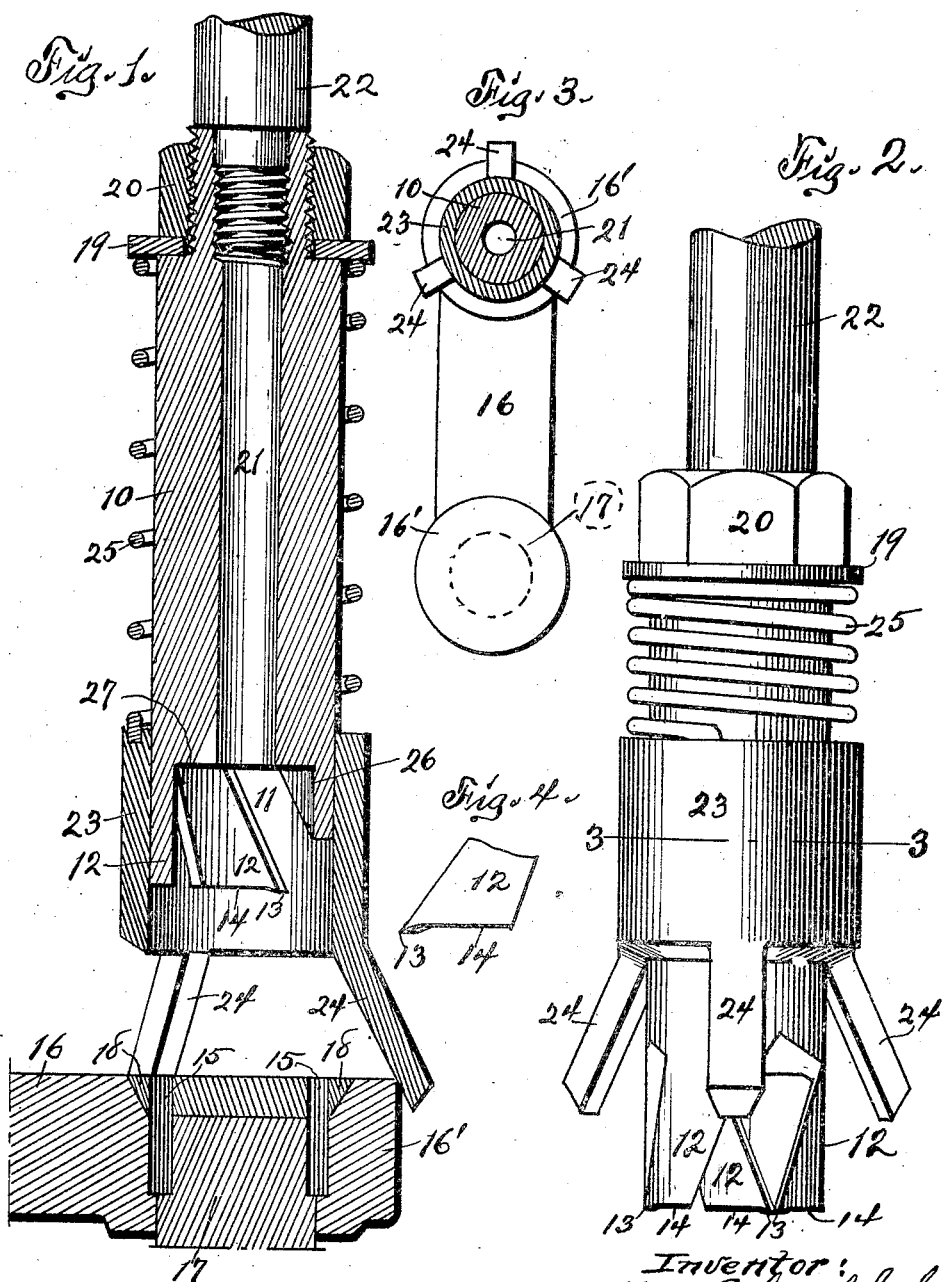

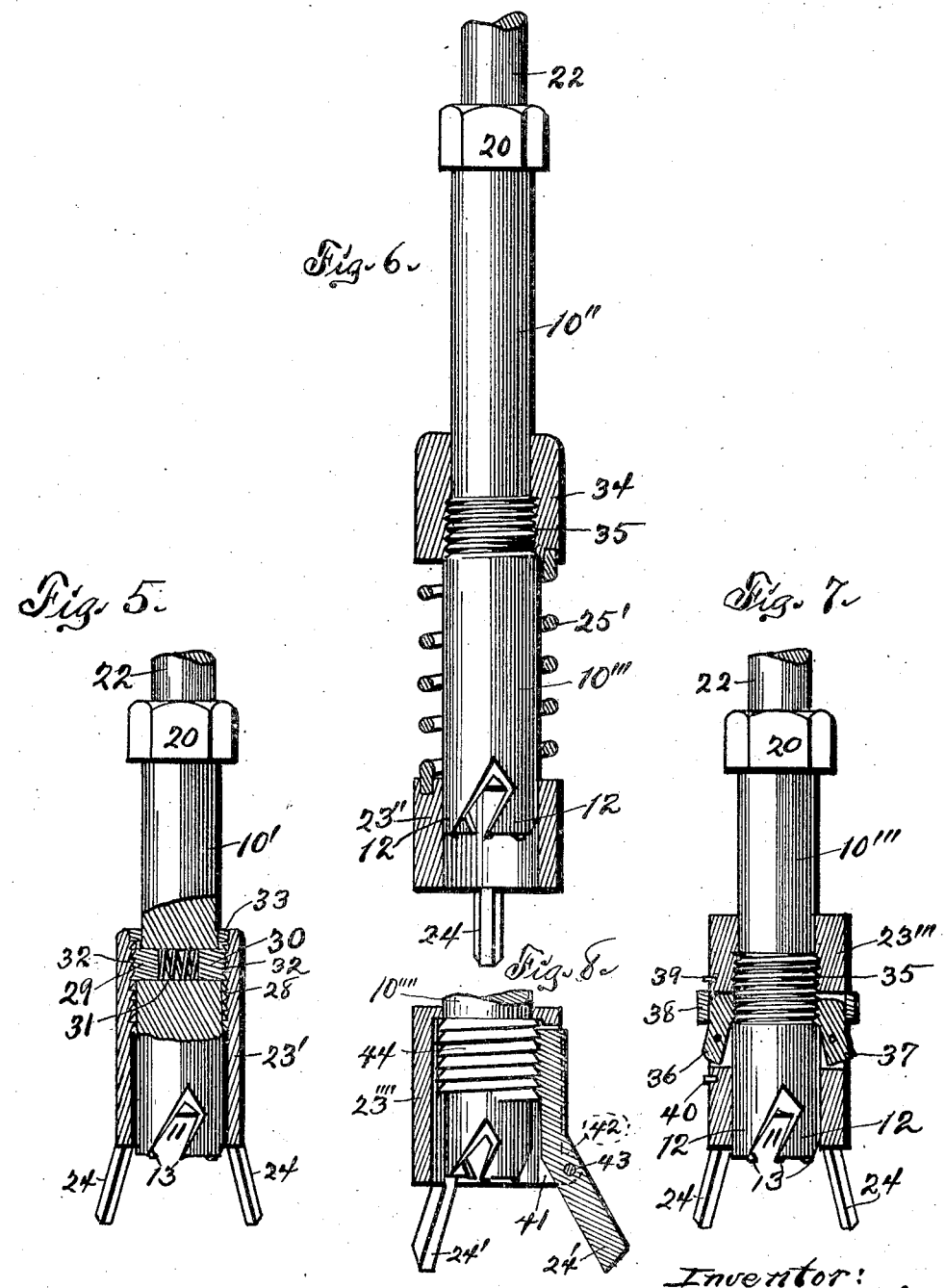

Patented Oct. 19, 1926.

1,603,359

UNITED STATES PATENT OFFICE.

HENRY SCHNECKLOTH, OF HOLSTEIN, IOWA.

CUTTING-OUT REAMER TOOL.

Application filed September 30, 1921. Serial No. 504,377.

The object of this invention is to provide improved means for cutting an annular groove in metal.

A further object of this invention is to provide improved means for removing a sealed joint between metal parts.

A further object of this invention is to provide means for centering a cutting tool relative to the work object.

A further object of this invention is to provide means for connecting a centering device non-rotatably to a cutting tool.

A further object of this invention is to provide spring-backing means to a centering device non-rotatably connected to a cutting tool, whereby the centering device is slidable on the tool.

A further object of this invention is to provide means for non-rotatably connecting a centering device and cutting tool and means for suspending said connection and permitting a sliding movement of the centering device on the tool after a pre-determined number of revolutions of the tool.

A further object of this invention is to provide means for suspending the connection between the centering device and tool.

A further object of this invention is to provide a spring-backed device, which is spring-connected to a centering device, the first device being threaded to a cutting tool and adapted to slide relative to the centering tool and to release the threaded connection by a further sliding connection upon a pre-determined number of revolutions of the tool.

My invention consists in the construction, arrangement and combination of elements hereinafter set forth, pointed out in the claims and illustrated by the accompanying drawing, in which—

Figure 1 is a vertical section of one form of my improved device in position for practical use. Figure 2 is a side elevation of the device, the centering device being moved to a different position on the tool and the spring thereon compressed. Figure 3 is a cross-section of the device on the indicated line 3—3 of Figure 2, a work object being shown in plan, the tool being shown on a reduced scale. Figure 4 is an elevation of one of the cutting bits broken away from the tool.

Figures 5, 6, 7 and 8 are vertical sections, partly in full lines, of different forms of my improved tool.

This tool is adapted to be operated by a hand-brace and is susceptible of use in a variety of ways and on a variety of work objects; but it is here shown and described as applied to the removal of connectors of storage batteries. My companion application filed November 26, 1920, Serial Number 426,468 shows a device for reaming and trimming battery posts or electrodes and this device goes further and makes it possible to remove the connectors without injury to the electrodes and provides means for centering the tool on the work object, which, together with other refinements, gives it a wider range of usefulness and adaptability.

In the construction of the device as shown in Figures 1 to 4, inclusive, the numeral 10 designates a cutting tool of end-reamer type, which is generally cylindrical in form and is provided with inclined end notches 11 forming bits 12. Each bit 12 is formed with a projecting edge 13 on its forward margin and a step 14 forming the end of the bit at the rear of said edge, said step lying in a plane at right angles to the longitudinal plane and axis of the tool 10, the edge 13 intersecting said plane. Thus in the rotation of the tool 10, the various edges 13 cut into and remove shavings from a work object and tend to producing an annular groove 15, the several steps 14 limiting the cut of the edges. This is desirable when working on soft metal, such as lead and alloys, of which connectors 16 and electrodes 17 and fillers or seals 18 ordinarily are made. The connector 16, electrode 17 and filler 18 shown are of the ordinary and common type in general use on storage batteries. A collar 19 is mounted on a reduced end portion of the tool 10 opposite the bits 12 and is held thereon by a nut 20 screwed on said reduced end portion. The tool 10 is formed with a central longitudinal bore 21, which bore is threaded in its outer end, opposite the bits 12, and is adapted to receive and be threaded on an end portion 22 of a hand-brace whereby the tool may be driven. A centering device having a collar 23 and legs 24 is provided. The collar 23 is mounted loosely on and is slidable longitudinally of the tool 10, embracing normally the bits 12, and an expansive coil spring 25 is mounted loosely in embracing relation on the tool, impinges at one end on the collar 19 and is fixed at its opposite end to the collar 23 and exerts a force tending to separate the collars. The legs 24 preferably are three in number, equally spaced apart in the circumference of the collar 23, and are inclined outwardly relative to the collar. The legs 24 are adapted to embrace a work object such as an end portion 16' of a connector 16, or in any suitable manner engage a work object and hold the centering device or collar 23 against rotation. Thus the engaging ends of the legs 24 would lie in a circle concentric with a circle common to the edges 13, the common center of which would be the center of the electrode 17 and coincident with the axis of the tool 10.

In practical use, starting with the parts in the relative positions shown in Figure 1 and the legs 24 centering the tool to the work object, pressure is applied to the brace coincident with manual rotation thereof to advance the tool 10 through the collar 23 and cause the bits to engage by the edges 13 and cut the annular groove 15 in said object. As the tool advances through the collar 23 the spring 25 is compressed and power is stored therein (Figure 2) and utilized to return the parts to normal position when manual pressure is removed. The tool 10 is formed with a chamber 26 within the annular row of bits 12 which chamber is of a depth substantially that of the annular groove 15 to be cut by the bits. Thus the shoulder 27 forming the bottom of the chamber 26 serves as a stop to determine the depth of the annular groove. The annular groove 15 is of a depth sufficient to release the seal between the connector 16 and electrode 17 and when it is desired to replace the connector (after investigation or repair of the battery) the groove is filled with scraps of lead and fired or fused in any desired manner to re-establish the seal and make a complete connection between the connector and electrode.

In the construction according to Figure 5, the spring 25 and collar 19 are omitted, the collar 23' is formed with an internal thread 28 of buttress type with its square face outermost, a transverse hole is formed in the central portion of the tool 10', spaced pawls 29, 30 are slidingly mounted in said hole, an expansive coil spring 31 is interposed between the pawls and tends to press them both outwardly radially of the tool and the outer ends of the pawls are formed with threads 32 of buttress type matching and adapted to engage the thread 28. In use, the collar 23' is moved manually into the relative position shown, the pawls yielding inwardly to permit the threads 32 to pass some of the thread 28 because of the type of thread employed, and the centering device is positioned on the work object and the tool operated as above described. The non-threaded portion of the collar 23' is reamed out in order that, after a few turns of the tool 10', the threaded pawls will pass beyond the thread 28 and release from the collar, thereupon the collar will move freely along the tool and release engagement of the legs 24 with the work object. The outer end of the threaded portion of the collar 23' is reamed out and a filler ring 33 is mounted therein and fits the shank of the tool 10' which is slightly less in diameter than the threaded portion thereof. The device may be disassembled or assembled by removing the nut 20.

In the construction according to Figure 6 a sleeve 34 is loosely mounted on a shank 10'' of the tool 10'', which shank is of slightly less diameter than the body of the tool, and said sleeve is formed with a thread matching a thread 35 on the body of the tool, the thread in the sleeve extending part way only through the bore thereof. A collar 23'' loosely embracing the bits 12 is spaced from the sleeve 34 and connected thereto by an open coil spring 25'. This form of device is prepared for use by screwing the sleeve 34 on the thread 35 (the threads being right) and the proceeding as above described; the centering device holding the spring and sleeve against rotation until the rotation of the tool in the sleeve releases the screw connection, after which the sleeve, spring and centering device may move freely along the tool and shank thereof until the sleeve contacts with the nut 20. The periphery of the sleeve 34 should be knurled.

In the construction according to Figure 7 the collar 23''' is loosely mounted on the shank 10''' and is formed with opposite longitudinal slots and pawls 36, 37 are pivoted in said slots and are doubly-inclined on their outer and inner faces, the outer ends of the inner faces thereof being formed with threads matching and adapted to engage at times with the thread 35. A ring 38 is loosely mounted on the collar 23''' and embraces the pawls 36, 37, which ring may be moved manually longitudinally of the collar within a range determined by stops 39, 40; said ring in its movements oscillating the pawls and determining the engagement of the threads thereon with the thread 35. In use, this form of device is adjusted manually into the relative positions shown and is operated as above described. When sufficient turns of the tool are made to disengage the threads the centering device may move freely toward and into contact with the nut 20. It may be reset by screwing action or by manipulation of the ring 38 on the pawls 36, 37, or, the ring may be set to release the pawls from the thread 35 and the tool be operated without the screw action.

In the construction according to Figure 8, the collar 23'''' is formed with end-opening slots 41, preferably three in number, and legs 24', bent slightly adjacent their centers, are mounted with one end portion each in said slots, the outer end portions of said legs being normally in diverging planes so as to embrace a work object as described in connection with the legs 24. The collar 23'''' is formed with radial lugs 42 on opposite sides of the outer ends of the slots 41 and the legs 24' are pivoted on pins 43 carried by said lugs. The inner end portions of the legs 24' are formed with buttress threads adapted to engage at times with a buttress thread 44 on the tool 10'''', said threads being held in screw engagement by expansion or spreading of the legs 24' by the work object in use. During use, and after the thread 44 has passed out of engagement with the threads on the inner ends of the legs, the collar 23'''' slips freely on the tool 10'''' and the legs relax their grip on the work object.

I claim as my invention:—

1. A cutting out reamer tool having bits on one end and a driving connection at the opposite end, a centering device loosely embracing the tool and adapted to be moved relative to and around the bits, and a threaded connection between said tool and centering device, which threaded connection is of less operative length than the range of movement of the device relative to the tool, which centering device has means for alternately applying and removing said threaded connection.

2. A cutting out reamer tool having bits on one end and a driving connection at the opposite end, a centering device loosely embracing the tool and a suspendible threaded connection between the tool and centering device, which centering device has means for alternately applying and removing said threaded connection.

3. A cutting out reamer tool having bits on one end and a driving connection at the opposite end, a centering device loosely embracing the tool, the centering device being formed with a buttress thread internally, and spring-backed pawls carried by the tool and formed with buttress threads matching and adapted to engage the thread on the device.

Signed at Holstein, in the county of Ida and State of Iowa, this 9th day of September, 1921.

HENRY SCHNECKLOTH.